US006312511B1

(12) United States Patent
Bilimoria et al.

(10) Patent No.: US 6,312,511 B1
(45) Date of Patent: Nov. 6, 2001

(54) KAOLIN CLAYS AND METHODS OF MAKING AND USING SAME

(75) Inventors: Bomi M. Bilimoria, Macon; John A. Manasso, Roswell; Mark S. Willis, Macon, all of GA (US)

(73) Assignee: Imerys Kaolin, Inc., Roswell, GA (US)

( * ) Notice: Subject to any disclaimer, the term of this patent is extended or adjusted under 35 U.S.C. 154(b) by 0 days.

(21) Appl. No.: 09/155,190

(22) PCT Filed: Mar. 21, 1997

(86) PCT No.: PCT/US97/04680

§ 371 Date: May 20, 1999

§ 102(e) Date: May 20, 1999

(87) PCT Pub. No.: WO97/34956

PCT Pub. Date: Sep. 25, 1997

Related U.S. Application Data

(60) Provisional application No. 60/013,939, filed on Mar. 22, 1996.

(51) Int. Cl.$^7$ .............................. C09C 1/28; C09C 1/42; C09C 3/00
(52) U.S. Cl. .......................... 106/486; 106/464; 106/468; 106/484; 106/487; 209/38
(58) Field of Search ..................... 106/486, 464, 106/468, 484, 487; 209/38

(56) References Cited

U.S. PATENT DOCUMENTS

| 3,171,718 |   | 3/1965  | Gunn et al.    |         |
|-----------|---|---------|----------------|---------|
| 3,940,550 | * | 2/1976  | Delfosse et al.| 106/464 |
| 5,085,707 | * | 2/1992  | Bundy et al.   | 106/484 |
| 5,169,443 |   | 12/1992 | Willis et al.  |         |
| 5,411,587 |   | 5/1995  | Willis et al.  |         |
| 5,454,865 | * | 10/1995 | Ginn et al.    | 106/486 |
| 5,478,388 | * | 12/1995 | Gane et al.    | 106/464 |
| 5,522,924 | * | 6/1996  | Smith et al.   | 106/484 |
| 5,624,488 | * | 4/1997  | Forbus et al.  | 106/484 |
| 5,645,635 | * | 7/1997  | Behl et al.    | 106/416 |

* cited by examiner

*Primary Examiner*—Michael Marcheschi
(74) *Attorney, Agent, or Firm*—Finnegan, Henderson, Farabow, Garrett, and Dunner, L.L.P.

(57) ABSTRACT

High brightness kaolin pigments and methods of making high brightness kaolin pigments are provided. Both delaminated and nondelaminated clays are provided having typical brightness of 87 or higher. The pigments have high brightness and good opacity, providing an optimum pigment for paper coating and paper filler. Also provided are blended high brightness kaolins having increased opacity properties.

53 Claims, No Drawings

KAOLIN CLAYS AND METHODS OF MAKING AND USING SAME

The present application claims priority from PCT application No. PCT/US97/04680, having an international filing date of Mar. 21, 1997, which claims priority from U.S. Provisional Application No. 60/013,939. filed on Mar. 22, 1996.

BACKGROUND OF THE INVENTION

1. Field of the Invention

The present invention relates to the field of kaolin clay products, including delaminated and nondelaminated kaolin clay pigment products, which are particularly useful for use in paper products. Specifically, the present invention relates to kaolin clay products having high brightness and good opacity characteristics, and methods of making and using such products.

2. Background Art

Kaolin clay pigments are obtained from kaolin crudes. The crudes can contain kaolin particles, oversize particle size impurities (grit), and fine and coarse particle size impurities, such as fine ferruginous or titaniferous impurities, which impart undesirable color to the clay. The kaolin particles typically occur in the crude over a wide range of particle sizes and shapes. Typically a kaolin crude, such as a typical Georgia crude will contain, after removing the grit, particles ranging in size from submicron or colloidal to 20 microns or larger. Typically the kaolin morphology includes arrangement in plates, which plates can be further arrayed in stacks. Particle size, impurity content and morphology can vary with location of the deposit and within any given deposit itself.

Particle size of kaolins are typically determined by sedimentation using Stokes law to convert settling rates to particle size distribution and assuming a spherical shape of the particles. Measurements of particle size determined by this method therefore are termed as e.s.d., i.e. equivalent spherical diameter, as determined by Sedigraph. Typically, kaolin particles finer than about 2 microns are composed of individual platelets, and particles larger than about 2 microns are composed of stacks or booklets of finer particles.

Previous methods of producing kaolin clay pigments for paper end uses have included steps such as delamination, which disaggregates large kaolin particles, i.e., stacks, into smaller particles having a higher aspect ratio, primarily by separating clay crystals along basal cleavages. See, e.g., U.S. Pat. Nos. 3,171,718 (Gunnet et al.); U.S. Pat. No. 5,169,443 (Willis et al.), U.S. Pat. No. 5,411,587 (Willis et al.). Typically, however, the resulting product has a brightness of around 84–85. For end uses such as use as paper coating, a kaolin having a higher brightness, and also possessing other desirable characteristics such as good opacity, would be highly advantageous for making a superior paper product. For end uses such as use as paper filling a kaolin having a higher brightness, and also possessing other desirable characteristics such as good opacity and good tensile strength, would be highly advantageous for making a superior yet economical paper product.

In paper production, currently precipitated calcium carbonate (PCC) is used as a filler in paper to reduce the percentage of pulp that must be used as filler in the paper, pulp being expensive. Precipitated calcium carbonate has been used as a filler to reduce that cost. Typically, precipitated calcium carbonate has been used at percentages around 12% to 15%. When precipitated calcium carbonate content was increased to about 18%, a reduction in paper tensile strength resulted. Therefore, PCC as a filler has been limited to about 12–15% by its degrading influence on physical properties.

The present invention provides both delaminated and nondelaminated kaolin pigments having surprising brightness of 87 or greater and even 90 or greater, and methods of making such kaolin pigments. These pigments further have good opacity and strong tensile strength. Thus the present invention provides a highly desirable pigment useful in any application wherein high brightness, opaque pigments are needed, and particularly in uses such as in paper coating applications, and in paper filling applications wherein pigments having not only high brightness and good opacity but also good tensile strength are needed.

SUMMARY OF THE INVENTION

The present invention provides a method of making a high brightness kaolin clay comprising:

a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness, b. fractionating the clay to retain a fraction that is 90% less than two microns in particle size, separately from the remaining clay, wherein the retained 90% less than two micron fraction comprises the high brightness kaolin clay.

The present invention further provides a method of making a high brightness kaolin clay comprising:

a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness to make a purified feed;

b. fractionating the clay into a first fraction of 90% less than 2 micron and a second fraction of remaining clay, c. blending the purified feed with the second fraction to form a blended clay having a ratio of purified feed to second fraction of from 100:0 to 0:100;

d. grinding the blended clay to a particle size of from 60 to 90% less than two microns.

The present invention additionally provides a method of making a high brightness kaolin clay comprising:

a. applying magnetic separation to a blunged, degritted kaolin clay crude obtained from an area in the Rio Capim area of Brazil having coordinates south 02°-21', west 47°-52' and having a particle size distribution as follows: 50–70% less than 2 microns, 20%–35% less than 0.5 microns and 5–20% less than 0.3 microns, all e.s.d. as determined by Sedigraph for a period of time sufficient to achieve the desired brightness, b. fractionating the clay to retain a fraction that is 90% less than two microns in particle size, separately from the remaining clay, wherein the retained 90% less than two micron fraction comprises the high brightness kaolin clay.

The present invention additionally provides a nondelaminated high brightness kaolin clay having the following characteristics:

a. particle size of 90% less than two microns (e.s.d. as measured by Sedigraph) and a ratio of % less than 2.0 microns/% less than 0.5 microns≦2.0;
b. brightness of 87 or greater; and
c. Brookfield viscosity measured at 20 rpm and 71% solids of greater than 100 cp.

The present invention additionally provides a nondelaminated high brightness kaolin clay having the following characteristics:
  a particle size of at least 60% less than two microns (e.s.d. as measured by Sedigraph);
  b brightness of 87 or greater; and
  c. Brookfield viscosity measured at 20 rpm and 71% solids of greater than 175 cp.

The present invention additionally provides a delaminated high brightness kaolin clay having the following characteristics:
  a. particle size of from 60 to 90% less than two microns (e.s.d. as measured by Sediograph);
  b. brightness of 87 or greater; and
  c. Hercules viscosity of less than 1000 rpm at 18 dynes.

The present invention further provides a high brightness kaolin clay comprising a blend of the following component clays:
  a. a nondelaminated kaolin clay having the following characteristics:
    i. particle size of 90% less than two microns (e.s.d. as measured by Sedigraph) and a ratio of % less than 2.0 microns/% less than 0.5 microns≦2.0;
    ii. brightness of 87 or greater; and
    iii. Brookfield viscosity measured at 20 rpm and 71% solids of greater than 100 cp; and
  b a delaminated kaolin clay having the following characteristics:
    i. particle size of from 60 to 90% less than two microns (e.s.d. as measured by Sedigraph);
    ii. brightness of 87 or greater; and
    iii. Hercules viscosity of less than 1000 rpm at 18 dynes,
in a ratio of from 100:0 to 0:100.

The present invention additionally provides a high brightness kaolin clay comprising a blend of the following component clays:
  a. a nondelaminated kaolin clay having the following characteristics:
    i. particle size of 60% less than two microns (e.s.d. as measured by Sedigraph);
    ii. brightness of 87 or greater; and
    iii. Brookfield viscosity measured at 20 rpm and 71% solids of greater than 175 cp; and
  b. a delaminated kaolin clay having the following characteristics:
    i. particle size of from 60 to 90% less than two microns (e.s.d. as measured by Sedigraph);
    ii. brightness of 87 or greater; and
    iii. Hercules viscosity of less than 1000 rpm at 18 dynes,
in a ratio of from 100:0 to 0:100.

The present invention further provides a method of making a high brightness kaolin clay comprising blending the following component clays:
  a. a nondelaminated kaolin clay having the following characteristics:
    i. particle size of 90% less than two microns (e.s.d. as measured by Sedigraph) and a ratio of. % less than 2.0 microns/% less than 0.5 microns≦2.0;
    ii. brightness of 87 or greater and
    iii. Brookfield viscosity measured at 20 rpm and 71% solids of greater than 100 cp; and
  b a delaminated kaolin clay having the following characteristics:
    i. particle size of from 60 to 90% less than two microns (e.s.d. as measured by Sedigraph);
    ii. brightness of 87 or greater; and
    iii. Hercules viscosity of less than 1000 rpm at 18 dynes in a ratio of from 100:0 to 0:00.

The present invention further provides a method of making a high brightness kaolin clay comprising blending the following component clays:
  a. a nondelaminated kaolin clay having the following characteristics:
    i. particle size of 60% less than two microns (e.s.d. as measured by Sedigraph);
    ii. brightness of 87 or greater; and
    iii. Brookfield viscosity measured at 20 rpm and 71% solids of greater than 175 cp; and
  b. a delaminated kaolin clay having the following characteristics:
    i. particle size of from 60 to 90% less than two microns (e.s.d. as measured by Sedigraph);
    ii. brightness of 87 or greater; and
    iii. Hercules viscosity of less than 1000 rpm at 18 dynes in a ratio of from 100:0 to 0 100.

DETAILED DESCRIPTION OF THE INVENTION

The present invention provides improved kaolin clays, methods of making such kaolin clays and methods of using the kaolin clays. The clays have qualities making them useful for paper coating applications, such as high brightness, good opacity and very good high and low shear viscosity, as well as properties useful in paper filler applications.

As used in the specification and in the claims, "a" can mean one or more, depending upon the context in which it is used.

Specifically, the present invention provides a method of making a high brightness kaolin clay comprising:
  a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph, for a period of time sufficient to achieve the desired brightness;
  b. fractionating the clay to retain a fraction that is 90% less than two microns in particle size, separately from the remaining clay, wherein the retained 90% less than two micron fraction comprises the high brightness kaolin clay.

After leaching, a standard processing step, the clays produced by the above method can have a brightness of 87 or greater, such as 88, 89, 90, 91 or greater.

The present invention also provides a method of making a high brightness kaolin clay comprising:
  a. settling out heavy metal impurities from a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph to make a purified feed;
  b. fractionating the clay into a first fraction of 90% less than 2 micron and a second fraction of remaining clay;

c. blending the purified feed with the second fraction to form a blended clay having a ratio of purified feed to second fraction of from 100:0 to 0:100, d. grinding the blended clay to a particle size of from 60 to 90% less than two microns.

The method can further comprise leaching the ground clay. The clays produced by the above method can have a brightness of 87 or greater, such as 88, 89, 90, 91 or greater.

Starting material for the present process of producing high-brightness clays is a crude that is typified by kaolin crude found in the Rio Capim area of Brazil, in particular the clay found in Para State in the northern section of Brazil just south of the equator, 40 kilometers east of the town of Tomé-Acu and 40 kilometers south of the town of Santana Do Capim. A preferable area is at coordinates south 02°-21', west 47'-52'. This starting material is referred to in this application as "RCC crude." Products from such crudes are referred to as "Capim clays" herein. Other suitable crudes are described in U.S. Pat. Nos. 5,169,443 and 5,411,587. Characteristics of a particular starting crude that exemplifies the desired starting crude include the following found for the Capim clays: (a) secondary deposit, (b) narrow particle size distribution, (c) minimum fines content, (d) high aspect ratio; (e) coarse, (f) high brightness, (g) low iron and titania, (h) blue tone, (i) high crystallinity index, (j) unique coating rheology, (k) no viscous clay, (l) platiness. The starting crude is typified by the examples wherein crude used in the examples herein is characterized.

The crude for use in this method typically has a particle size distribution of: 50%–70% less than 2 microns, 20%–35% less than 0.5 microns and 5%–20% less than 0.3 microns, all e.s.d. as determined by Sedigraph. The particle size distribution can also have about 5% to about 15% less than 0.3 microns.

The isolated crude is subjected to standard initial processing, that is, it is blunged and degritted, discarding the grit. For blunging, standard methods are followed. A typical blunging will include blunging at about 40% solids to about 75% solids, in water with one or more dispersing agent to completely disperse and blunge. Blunging can be performed to the desired extent to disperse the clay to obtain the desired level of recovery of clay by separating "books," or stacks of kaolinite layers from each other and therefore facilitate recovery of maximum amounts of clay. The blunging process can be repeated at any point in the process if it is desired to capture more kaolin out of the crude isolate. A typical blunging can be performed at about 55% solids; however, it can be performed at, for example, 40% solids, 45% solids, 50% solids, 60% solids, 65% solids or 70% solids. The dispersant can be, for example, soda ash and polyacrylate, such as a 10% solution of 45% soda ash and 55% polyacrylate, and, for example, at about 2.8 lbs per ton.

Degritting is a standard process and is typically performed using a 100 mesh screen. The grit is then discarded and the retained clay is diluted to a suitable sufficiently to allow good settling to occur in the settling step. For example, a preferable dilution is about 40% solids.

If large, heavy impurities are present, the diluted feed is then subjected to a settling step. In particular the Capim clays typically have visible black impurities, which are heavy metal impurities. Georgia clays may have quartz impurities, which can also be removed by utilizing this step. Preferably the sedimentation time is at least 5 minutes for every four feet of clay. The fines are then siphoned off and used for the remainder of the process, while the large impurities are discarded. This step can be advantageously utilized to control the brightness of the final kaolin pigment product. The more thorough the settling out and removal of impurities at this step, the higher the brightness that can be achieved. Furthermore, once the process is completed and a final product obtained, if the brightness of the product is not at a desirable high level, the product can be subjected to another round of settling the impurities out in an approximately 40% dilution. Alternatively, if the end product is to be ultimately obtained from a fraction that is a fairly uniformly small particle size (e.g., a 90% less than 2 micron fraction), this step can be eliminated, even if these impurities are present, because the large impurities will be eliminated by the fractionation process.

The feed is then screened on a 325 mesh screen, as is standard in the art, and the fines are retained. It is advantageous for purposes of economy to evaluate the rejected coarse fraction at this point to determine if significant amounts of kaolin remain in the coarse fraction. If so, the coarse fraction can be reblunged to recover additional kaolin, which is then processed according to this method.

The retained –325 fraction is then run through a magnet to remove magnetic impurities. This magnetic separation is an important step in achieving high brightness in the final product. If the brightness is not sufficient, the product can be subjected to a further round of magnetic separation and final processing. Typically, this magnetic separation process is performed on a 1 minute retention, 8 minute cycle time. Thus, a time sufficient to achieve the desired level of brightness in the end product can vary according to the crude and according to the desired brightness desired in the end product. This time can be varied based upon the typical time provided herein as understood by the skilled artisan If the end product is not of sufficient brightness, then the period of magnetic separation presumably was not sufficient, and the product can readily be rediluted and magnetically separated again. Once the desired amount of magnetic separation is performed, the resulting "purified feed" from the separator can be treated any of several different ways to recover any of several different, high brightness products.

In one method, typified in the examples as "product C," the purified feed is then size fractionated to get a 90% less than 2 micron fraction. This fraction is the high brightness kaolin pigment. It preferably has a brightness of 87 or greater. Thus, it can have a brightness of 88, 89, 90, 91, or higher. For example, provided in the examples are 90% less than 2 micron fraction clays having brightness of 89.80, 91.19. This fraction can then be subjected to any of several known finishing processes, to put it in a desired form for shipping or for its final use, as known in the art and also as described and exemplified herein.

In a second method, typified in the examples as "product D," the purified feed remaining after removal of the 90% less than 2 micron fraction is then size fractionated to get a 60% less than 2 micron fraction. This fraction is the high brightness kaolin pigment. It preferably has a brightness of 87 or greater. Thus, it can have a brightness of 88, 89, 90, 91, or higher. For example, provided in the examples are 60% less than 2 micron fraction clays having brightness of 89.63. This fraction can then be subjected to any of several known finishing processes, to put it in a desired form for shipping or for its final use, as known in the art and also as described and exemplified herein.

In a third method, typified in the examples as "product A," a blend is made comprising (1) the purified whole fee and (2) a purified feed remaining after removal of the 90% less than 2 micron fraction. The blend can be any ratio of (1) to (2) of from 100(1):0(2) to 0(1):100(2). For example, the ratio can be about 90(1):10(2), about 80(1):20(2), about 70(1):30(2), about 60(1):40(2), about 50(1):50(2), about 40(1):60(2), about 30(1):70(2), about 20(1):80(2), or about 10(1):90(2). This blend is then subjected to delamination. Mechanical delamination is performed to disrupt and separate to an extent the kaolinite layers within the books. Any grinding media can be used; typical grinding media include glass beads, sand, plastic cylinders, nylon or other polymer pellets, small ceramic balls. It is preferred that the delamination be performed using a hard grinding media. Particularly preferred hard grinding media are glass beads and sand. In general, the smaller the media, the more delamination; therefore, small size glass beads or sand are preferred. In this method, it is desired to achieve fairly extensive grinding, i.e., to achieve from about 60% to as much as 90% less than 2 microns. For example, the clay can be ground to achieve about 60%, about 70%, about 80%, about 85% or about 90% less than two microns. The clay is preferably ground to about 75%, 76%, 77%, 78%, 79%, or 80% less than 2 microns. This delaminated clay is the high brightness kaolin pigment (exemplified herein as "product A"). This delaminated clay can optionally be fractionated to 90% recovery (exemplified herein as "product B"). It preferably has a brightness of 87 or greater. Thus, it can have a brightness of 87, 88, 89, 90, 91, or higher. For example, provided in the examples are approximately 80% less than 2 micron fraction clays having brightness of 90.82, 91.10, 91.03, and 91.11. These products can then be subjected to any of several known finishing processes, to put it in a desired form for shipping or for its final use, as known in the art and also as described and exemplified herein.

Thus, the present invention provides a method of making a high brightness kaolin clay comprising:
a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness to make a purified feed;
b. fractionating the clay into a first fraction of 90% less than 2 micron and a second fraction of remaining clay;
c. blending the purified feed with the second fraction to form a blended clay having a ratio of purified feed to second fraction of from 100:0 to 0:100;
d. grinding the blended clay to a particle size of from 60 to 90% less than two microns.

These high brightness kaolin pigment products can then be treated by methods standard in the art for final preparation of a high-brightness product, such as by leaching, acid flocculation, filtering, and can be prepared for shipping as desired, e.g., redispersement, spray-drying, acid pulverization or shipping as a slurry.

The present invention further provides high brightness kaolin clays produced by these methods. Thus, the present invention provides a high brightness kaolin clay made by a method comprising (a) applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph, for a period of time sufficient to achieve the desired brightness; and (b) fractionating the clay to retain a fraction that is 90% less than two microns in particle size, wherein the clay (the retained 90% less than two microns fraction) has a brightness of 87 or greater after standard leaching. Thus the clay can have a brightness of 87, 88, 89, 90, 91 or greater.

The present invention further provides a high brightness kaolin clay produced by a method comprising a. settling out heavy metal impurities from a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph to make a purified feed;
b. fractionating the clay into a first fraction of 90% less than 2 micron and a second fraction of remaining clay;
c. blending the purified feed with the second fraction to form a blended clay having a ratio of purified feed to second fraction of from 100:0 to 0:100;
d. grinding the blended clay to a particle size of from 60 to 90% less than two microns, wherein the clay product has a brightness of 87 or greater. Thus the clay can have a brightness of 87, 88, 89, 90, 91 or greater.

The present invention further provides a high brightness kaolin clay made by a method comprising
a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
b. fractionating the clay to retain a fraction that is 90% less than two microns in particle size, separately from the remaining clay,
c. further comprising the step of further fractionating the remaining clay to retain a second fraction that is 60% less than two microns in particle size, and wherein the 60% less than two micron fraction comprises the high brightness kaolin clay, and wherein the clay has a brightness of 87 or greater. Thus the clay can have a brightness of 87, 88, 89, 90, 91 or greater.

The present invention further provides a high brightness kaolin clay made by a method comprising
a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
b. fractionating the clay to retain a fraction that is 90% less than two microns in particle size, separately from the remaining clay,
c. further fractionating the remaining clay to retain a second fraction that is 60% less than two microns in particle size, and wherein the 60% less than two micron fraction comprises the high brightness kaolin clay, and wherein the clay product has a brightness of 87 or greater. Thus the clay can have a brightness of 87, 88, 89, 90, 91 or greater.

The present invention further provides a high brightness kaolin clay made by a method comprising
a. applying magnetic separation to a blunged, degritted kaolin clay crude having a particle size distribution as follows. 50%–70% less than 2 microns, 20%–35% less than 0.5 microns and 5%–20% less than 0.3 microns, all e.s.d. as determined by Sedigraph for a period of time sufficient to achieve the desired brightness to make a purified feed;
b. fractionating the clay into a first fraction of 90% less than 2 micron and a second fraction of remaining clay;
c. blending the purified feed with the second fraction to form a blended clay having a ratio of purified feed to second fraction of from 100:0 to 0:100, d. grinding the blended clay to a particle size of from 60 to 90% less than two microns, wherein the clay has a brightness of 87 or greater. Thus the clay can have a brightness of 87, 88, 89, 90, 91 or greater.

The present invention further provides a high brightness kaolin clay made by a method comprising a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness to make a purified feed;

b. fractionating the clay into a first fraction of 90% less than 2 micron and a second fraction of remaining clay, c. blending the purified feed with the second fraction to form a blended clay having a ratio of purified feed to second fraction of from 100:0 to 0:100;

d. grinding the blended clay to a particle size of from 60 to 90% less than two microns, e. further comprising fractionating the blended clay to about 90% recovery, and wherein the clay has a brightness of 87 or greater. Thus the clay can have a brightness of 87, 88, 89, 90, 91 or greater.

The present invention also provides a nondelaminated high brightness kaolin clay having the following characteristics (a) particle size of 90% less than two microns (e.s.d. as measured by Sedigraph) and a ratio of % less than 2.0 microns/% less than 0.5 microns≦2.0; (b) brightness of 87 or greater; and (c) Brookfield viscosity measured at 20 rpm and 71% solids of greater than 100 cp. For example, the Brookfield viscosity can also be greater than 150 cp, greater than 175 cp or greater than 200 cp. The clay can therefore have a brightness of 87, 88, 89, 90, 91 or greater.

The present invention also provides a nondelaminated high brightness kaolin clay having the following characteristics: (a) particle size of at least 60% less than two microns (e.s.d. as measured by Sedigrapli); (b) brightness of 87 or greater. and (c) Brookfield viscosity measured at 20 rpm and 71% solids of greater than 175 cp. The clay can therefore have a brightness of 87, 88, 89, 90, 91 or greater.

The present invention also provides a delaminated high brightness kaolin clay having the following characteristics: (a) particle size of from 60 to 90% less than two microns (e.s.d. as measured by Sedigraph); (b) brightness of 87 or greater; and (c) Hercules viscosity of less than 1000 rpm at 18 dynes. The clay can therefore have a brightness of 87, 88, 89, 90, 91 or greater.

In another embodiment, two or more of the herein described high brightness products, such as the products produced by the four methods exemplified to produce products A, B, C, and D, can be blended to produce another improved clay within the present invention. Blending these products results in a surprising synergistic effect. In particular, it results in high brightness kaolin pigments having improved opacity over the starting products. Examples of such blends and their properties are provided in the examples. Additional blends have been made that have shown exceptional properties, Thus the present invention provides highly desirable clay blends.

Thus the present invention provides a high brightness kaolin clay comprising a blend of the following component clays:

a. a nondelaminated kaolin clay having the following characteristics:
  i. particle size of 90% less than two microns (e.s.d. as measured by Sedigraph) and a ratio of: % less than 2.0 microns/% less than 0.5 microns≦2.0;
  ii. brightness of 87 or greater; and
  iii. Brookfield viscosity measured at 20 rpm and 71% solids of greater than 100 cp; and b. a delaminated kaolin clay having the following characteristics:
  i. particle size of from 60 to 90% less than two microns (e.s.d. as measured by Sedigraph);
  ii. brightness of 87 or greater; and
  iii. Hercules viscosity of less than 1000 rpm at 18 dynes, in a ratio of from 100:0 to 0:100. The component clays can be present preferably at a ratio of from 70:30 to 30:70, such as 70:30, 60:40, 50:50, 40:60, and 30:70. The nondelaminated clay is exemplified herein by product C, the delaminated clay is exemplified by products A and B.

The present invention also provides a high brightness kaolin clay comprising a blend of the following component clays:

a. a nondelaminated kaolin clay having the following characteristics:
  i. particle size of 60% less than two microns (e.s.d. as measured by Sedigraph);
  ii. brightness of 87 or greater; and
  iii. Brookfield viscosity measured at 20 rpm and 71% solids of greater than 175 cp; and b. a delaminated kaolin clay having the following characteristics:
  i. particle size of from 60 to 90% less than two microns (e.s.d. as measured by Sedigraph);
  ii. brightness of 87 or greater; and
  iii. Hercules viscosity of less than 1000 rpm at 18 dynes, in a ratio of from 100:0 to 0:100. The component clays can be present preferably at a ratio of from 70:30 to 30:70, such as 70:30, 60:40, 50:50, 40:60, and 30:70. The component clays can each have a brightness of 87, 88, 89, 90, 91 or greater. The nondelaminated clay is exemplified herein by product D; the delaminated clay is exemplified by products A and B. The blended clay preferably has a higher opacity than either of the component clays, as seen in the examples.

The present invention also provides a method of making a high brightness kaolin clay comprising blending the following component clays.

a. a nondelaminated kaolin clay having the following characteristics:
  i. particle size of 90% less than two microns (e.s.d. as measured by Sedigraph) and a ratio of: % less than 2.0 microns/% less than 0.5 microns≦2.0;
  ii. brightness of 87 or greater; and
  iii. Brookfield viscosity measured at 20 rpm and 71% solids of greater than 100 cp; and b a delaminated kaolin clay having the following characteristics:
  i. particle size of from 60 to 90% less than two microns (e.s.d. as measured by Sedigraph);
  ii. brightness of 87 or greater; and
  iii. Hercules viscosity of less than 1000 rpm at 18 dynes, in a ratio of from 100:0 to 0:100. The component clays can be present preferably at a ratio of from 70:30 to 30:70, such as 70:30, 60:40, 50:50, 40:60. and 30:70. The nondelaminated clay is exemplified herein by product C; the delaminated clay is exemplified by products A and B.

The present invention also provides a method of making a high brightness kaolin clay comprising blending the following, component clays:

a. a nondelaminated kaolin clay having the following characteristics:
   i. particle size of 60% less than two microns (e.s.d. as measured by Sedigraph);
   ii. brightness of 87 or greater; and
   iii. Brookfield viscosity measured at 20 rpm and 71% solids of greater than 175cp; and
b. a delaminated kaolin clay having the following characteristics:
   i. particle size of from 60 to 90% less than two microns (e.s.d. as measured by Sedigraph);
   ii. brightness of 87 or greater; and
   iii. Hercules viscosity of less than 1000 rpm at 18 dynes, in a ratio of from 100:0 to 0:100. The component clays can be present preferably at a ratio of from 70:30 to 30:70, such as 70:30, 60:40, 50:50, 40:60, and 30:70. The component clays can each have a brightness of 87, 88, 89, 90, 91 or greater. The nondelaminated clay is exemplified herein by product D; the delaminated clay is exemplified by products A and B.

The high brightness kaolin pigments of this invention and the blends thereof are within the scope of the present invention. These products have characteristics such as high brightness, typically around 89–91% brightness as exemplified in the examples. For paper coating applications these clays are highly useful. They have good rheology, that is, higher coating solids and better runnability. They have beneficial optical properties, high opacity and high brightness. When used in paper coating applications one can reduce prime pigments, such as titanium dioxide and calcined clay. For printability they have high print gloss and good snap. For binder reduction they have good ink pick strength. These products have useful viscosity as exemplified in the examples, both Hercules viscosity and Brookfield viscosity, and they have particle size distribution as exemplified in the examples. Applications for which these products are highly suited and beneficial are exemplified throughout the examples.

The herein described products, exemplified by products A, B, C and D, additionally have wet end paper uses in alkaline papermaking systems. The products of the present invention can be utilized to make paper filler that allows the increase of percentage filler used while maintaining sufficient tensile strength of the paper to yield a paper product having sufficient strength to avoid breakage in the paper production machinery. Traditional fillers consist of precipitated calcium carbonate (PCC). The present inventive filler comprises a blend or mixture of precipitated calcium carbonate and kaolin clay. The high brightness clay of this invention can be used in this filler to preferably have a brightness of 87 or greater, such as 87, 88, 89, 90 or greater. A preferable clay is a clay derived from Brazilian crude and produced as described herein, such as products A, B, C or D or blends thereof A paper product made with this filler at greater than 12%, such as at 18%, has equivalent or higher opacity, brightness and breaking length than the same paper product made with 12% PCC. A paper product made with this filler at greater than 12%, such as 18%, will have equivalent or higher opacity and brightness and equivalent or better breaking length, but preferably better breaking length, than the same paper product made with 18% PCC. As shown in the examples, one can obtain a paper having PCC/kaolin filter as high as 18% that has a good breaking length, or tensile strength, as compared to that obtained with precipitated calcium carbonate alone at 12%. These papers having 18% kaolin/precipitated calcium carbonate fillers retain high brightness and good opacity. One can very readily make additional filler combinations and paper products with such fillers by varying the relative percentages of kaolin and precipitated calcium carbonate. In any of these fillers, the ration of PCC to kaolin can be any desired ratio, however, a preferable ratio of PCC:kaolin is from about 60:40 to about 70:30, and can include, for example, 67:33.

Thus, the present invention provides a filler system for paper products containing precipitated calcium carbonate, comprising (a) precipitated calcium carbonate and (b) the high brightness kaolin clay produced by a method as described herein for producing a high brightness kaolin clay. The system can further comprise other pigments or fillers. Such other pigments or fillers are known and standard in the art, such as, for example, titania, aluminum oxides, silicas, plastic pigments, and ground calcium carbonate. Furthermore, in each of these systems, the precipitated calcium carbonate is preferably present at $\leq 8\%$ by weight in the paper and the kaolin clay is present at a level of at least 50% of the precipitated calcium carbonate.

Thus, the present invention specifically provides a filler system for paper products containing precipitated calcium carbonate, comprising
a. precipitated calcium carbonate and
b. the high brightness kaolin clay produced by a method comprising
   a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
   b. fractionating the clay to retain a fraction that is 90% less than two microns in particle size, separately from the remaining clay, wherein the retained 90% less than two micron fraction comprises the high brightness kaolin clay.

The present invention further specifically provides a filler system for paper products containing precipitated calcium carbonate, comprising
a. precipitated calcium carbonate and
b. the high brightness kaolin clay produced by a method comprising
   i. settling out heavy metal impurities from a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph to make a purified feed;
   ii. fractionating the clay into a first fraction of 90% less than 2 micron and a second fraction of remaining clay;
   iii. blending the purified feed with the second fraction to form a blended clay having a ratio of purified feed to second fraction of from 100:0 to 0:100;
   iv. grinding the blended clay to a particle size of from 60 to 90% less than two microns. Additionally, if desired the blended, ground clay can be fractionated to about 90% recovery.

The present invention further provides this paper filler system wherein precipitated calcium carbonate is present at $\geq 8\%$ by weight in the paper and the kaolin clay is present at a level of at least 50% of the precipitated calcium carbonate.

The present invention further provides the present invention provides a filler system for paper products containing precipitated calcium carbonate, comprising a. precipitated calcium carbonate and
b. the high brightness kaolin clay produced by a method comprising
   i. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
   ii. fractionating the clay to retain a fraction that is 90% less than two microns in particle size, separately from the remaining clay,
   iii. further comprising the step of further fractionating the remaining clay to retain a second fraction that is 60% less than two microns in particle size, and wherein the 60% less than two micron fraction comprises the high brightness kaolin clay.

The precipitated calcium carbonate is preferably present at $\geq 8\%$ by weight in the paper and the kaolin clay is present at a level of at least 50% of the precipitated calcium carbonate.

Therefore, also provided by this invention are methods of producing a paper product using as filler the herein described PCC/kaolin blend fillers. In any of these methods, the filler can comprise any amount of the paper product as desired, it being standard in the art to add varying percentages of filler to determine final product qualities. A preferable percentage is from about 12% to about 18% filler. The higher the percentage of filler, typically the less expensive the paper is to produce The examples provide guidelines for resulting brightness, opacity and tensile strength for a continuum between 12% and 18%, all of which demonstrate useful properties. Preferable filler percentages, therefore, can be 12%, 13%, 14%, 15%, 16%, 17% and 18% filler.

Also provided herein is a method of producing a precipitated calcium carbonate-containing paper product in which precipitated calcium carbonate is added at $\geq 8\%$ of the weight of the paper and kaolin is added at a level of at least 50% of precipitated calcium carbonate level, comprising adding as filler a blend of precipitated calcium carbonate and a high brightness kaolin clay of this invention.

Thus specifically provided herein is a method of producing, a precipitated calcium carbonate-containing paper product in which precipitated calcium carbonate is added at $\geq 8\%$ of the weight of the paper and kaolin is added at a level of at least 50% of precipitated calcium carbonate level, comprising adding as filler a blend of
a. precipitated calcium carbonate; and
b. the high brightness kaolin clay produced by a method comprising
   a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
   b. fractionating the clay to retain a fraction that is 90% less than two microns in particle size, separately from the remaining clay, wherein the retained 90% less than two micron fraction comprises the high brightness kaolin clay.

Also provided herein is a method of producing a precipitated calcium carbonate-containing paper product in which precipitated calcium carbonate is added at $\geq 8\%$ of the weight of the paper and kaolin is added at a level of at least 50% of precipitated calcium carbonate level, comprising adding as filler a blend of a. precipitated calcium carbonate; and
b. the high brightness kaolin clay produced by a method comprising
   i. settling out heavy metal impurities from a blunged, degritted kaolin clay crude having a particle size distribution as follows 50%–70% less than 2 microns, 20%–35% less than 0.5 microns and 5%–20% less than 0.3 microns, all e.s.d. as determined by Sedigraph to make a purified feed;
   ii. fractionating the clay into a first fraction of 90% less than 2 micron and a second fraction of remaining clay;
   iii. blending the purified feed with the second fraction to form a blended clay having a ratio of purified feed to second fraction of from 100:0 to 0:100;
   iv. grinding the blended clay to a particle size of from 60 to 90% less than two microns. Additionally, if desired the blended, ground clay can be fractionated to about 90% recovery.

Also provided herein is a method of producing a precipitated calcium carbonate-containing paper product in which precipitated calcium carbonate is added at $\geq 8\%$ of the weight of the paper and kaolin is added at a level of at least 50% of precipitated calcium carbonate level, comprising adding as filler a blend of a. precipitated calcium carbonate, and
b. the high brightness kaolin clay produced by a method comprising
   i. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the desired brightness;
   ii. fractionating the clay to retain a fraction that is 90% less than two microns in particle size, separately from the remaining clay,
   iii. further comprising the step of further fractionating the remaining clay to retain a second fraction that is 60% less than two microns in particle size, and wherein the 60% less than two micron fraction comprises the high brightness kaolin clay.

Many steps recited herein are standard methods of handling kaolin clays and therefore details are not provided herein, since they are known in the art. For example, U.S. Pat. Nos. 3,586,523; 3,798,044, 3,097,801; 3,075,710; 5,169,443; and 5,411,587 and the references cited therein provide such background and are hereby incorporated in their entirety.

The present invention is more particularly described in the following examples which are intended as illustrative only since numerous modifications and variations therein will be apparent to those skilled in the art.

EXAMPLES

In any of the examples, kaolin designated as DB was obtained in Georgia. Clays labeled Capim DL correspond with products A and/or B, and clays labeled Capim 90 correspond with product C.

Example 1

Crude Characterization

TABLE 1

| RCC CRUDE CHARACTERISTICS | | |
| --- | --- | --- |
| | CRUDE A | CRUDE B |
| % <20 mesh | 99.08 | 99.89 |
| % <30 mesh | 98.75 | 99.83 |
| % <50 mesh | 96.95 | 90.86 |
| % <60 mesh | 95.52 | 87.80 |
| % <70 mesh | 94.17 | 82.96 |
| % <80 mesh | 92.94 | 74.51 |
| % <100 mesh | 90.82 | 68.48 |
| % <200 mesh | 86.22 | 59.89 |
| % <325 mesh | 84.37 | 58.32 |
| −325 MESH KAOLIN FRACTION OF RCC CRUDES | | |
| Brightness | 81.34 | 83.91 |
| % $TiO_2$ | 0.709 | 0.433 |
| % $Fe_2O_3$ | 0.621 | 0.553 |
| % <20$\mu$ | 98.4 | 99.1 |
| % <10$\mu$ | 92.6 | 93.5 |
| % <5$\mu$ | 81.0 | 81.3 |
| % <2$\mu$ | 63.9 | 59.6 |
| % <1$\mu$ | 48.2 | 44.2 |
| % <0.5$\mu$ | 27.5 | 25.4 |
| % <0.3$\mu$ | 11.3 | 12.3 |

Example 2

Preparation of Products A, B, C and D

Product C (Capim 90 (90% <2 fraction)
1. Blunge 600 lbs. of Rio Capim crude at 55% solids using 10% solution of 45% soda ash and 55% polyacrylate, 2.8 lbs./ton dispersant.
2. Screen on 100 mesh screen to remove grit.
3. Dilute to 40% solids.
4. Settle out and discard black particles for 5 minutes for every 4 feet of clay, and siphon off fines.
5. Screen fines on 325 mesh screen.
   a. (Optional) Reblunge +325 mesh grit at 35% solids and screen on 325 mesh. Reject coarse.
6. Subject −325 fines to magnetic separation, 1 minute retention, 8 minute cycle time.
7. Recover purified feed.
8. Fractionate by centrifugation to get 90% <2 micron fraction.
9. Leach 4 lbs./ton, flocculate to pH=3.5, alum 2 lbs./ton, filter, redisperse, spray dry (50 lbs.).

Product D (Capim 90) (60% <2 fraction)
1. Blunge 600 lbs. of Rio Capim crude at 55% solids using 10% solution of 45% soda ash and 55% polyacrylate, 2.8 lbs./ton dispersant.
2. Screen on 100 mesh screen to remove grit.
3. Dilute to 40% solids.
4. Settle out and discard black particles for 5 minutes for every 4 feet of clay, and siphon off fines.
5. Screen fines on 325 mesh screen.
   a. (Optional) Reblunge +325 mesh grit at 35% solids and screen on 325 mesh. Reject coarse.
6. Subject −325 fines to magnetic separation, 1 minute retention, 8 minute cycle time.
7. Recover purified feed.
8. Fractionate by centrifugation to get a 90% <2 micron fraction and a coarse component called remaining clay (B-fraction).
9. Fractionate the B-fraction by centrifugation to get 60% <2 microns ("coarse B fraction").
10. Leach 4 lbs./ton, flocculate to pH=3.5, alum 2 lbs./ton, filter, redisperse, spray dry (5–10 lbs.).

Product A (Capim DL) (Delaminated)
1. Blunge 600 lbs. of Rio Capim crude at 55% solids using 10% solution of 45% soda ash and 55% polyacrylate, 2.8 lbs./ton dispersant.
2. Screen on 100 mesh screen to remove grit.
3. Dilute to 40% solids.
4. Settle out and discard black particles for 5 minutes for every 4 feet of clay, and siphon off fines.
5. Screen fines on 325 mesh screen
   a. (Optional) Reblunge +325 mesh grit at 35% solids and screen on 325 mesh. Reject coarse.
6. Subject −325 fines to magnetic separation, 1 minute retention, 8 minute cycle time.
7. Recover purified feed.
8. Blend 72 lbs. Coarse B fraction (from product D, step 8) with 48 lbs. Purified feed (i.e., 60% coarse B fraction/40% purified feed) to make grinder charge.
9. Grind grinder charge with glass beads to 80% <2 microns by Sedigraph.
10. Leach 4 lbs./ton, acid flocculate to pH=3.5, add 2 lbs./ton alum.
11. Filter on press.
12. Redisperse with 40% soda ash/60% polyacrylate.
13. Spray dry.

Product B (Capim DL) (delaminated)
1. Blunge 600 lbs. of Rio Capim crude at 55% solids using 10% solution of 45% soda ash and 55% polyacrylate, 2.8 lbs./ton dispersant.
2. Screen on 100 mesh screen to remove grit.
3. Dilute to 40% solids.
4. Settle out and discard black particles for 5 minutes for every 4 feet of clay, and siphon off fines.
5. Screen fines on 325 mesh screen.
   a. (Optional) Reblunge +325 mesh grit at 35% solids and screen on 325 mesh. Reject coarse.
6. Subject −325 fines to magnetic separation, 1 minute retention, 8 minute cycle time.
7. Recover purified feed.
8. Blend 72 lbs. Coarse B fraction (from product D, step 8) with 48 lbs. Purified feed (i.e., 60% coarse B fraction/40% purified feed) to make grinder charge.
9. Grind grinder charge with glass beads to 80% <2 microns by Sedigraph.
10. Fractionate to 90% recovery.
11. Leach 4 lbs./ton, acid flocculate to pH=3.5, add 2 lbs./ton alum.
12. Filter on press.
13. Redisperse with 40% soda ash/60% polyacrylate.
14. Spray dry.

Example 3

Characterization of products A, B, C and D

TABLE 2

| PRODUCTS FROM RCC CRUDE: | | | | |
| --- | --- | --- | --- | --- |
| | SAMPLE IDENTIFICATION | | | |
| TEST | A | B | C | D |
| S.D. Brightness [GE] | 90.82 | 91.03 | 89.80 | 89.63 |
| Brookfield Viscosity, cp | | | | |
| 10 RPM | 410 | 370 | 260 | 470 |
| 20 RPM | 270 | 240 | 180 | 350 |
| 50 RPM | 160 | 140 | 112 | 268 |
| 100 RPM | 131 | 113 | 100 | 432 |
| Viscosity Solids % | 67.0 | 67.0 | 71.0 | 71.2 |

TABLE 2-continued

PRODUCTS FROM RCC CRUDE:

| TEST | SAMPLE IDENTIFICATION | | | |
|---|---|---|---|---|
| | A | B | C | D |
| Hercules Viscosity | 350 RPM | 425 RPM | 2.8 dynes | 165 RPM |
| pH (20% Solids) | 6.86 | 8.03 | 7.12 | 7.12 |
| +325 Mesh Grit, % | 0.0006 | 0.0008 | 0.0006 | 0.0037 |
| Sedigraph Analysis | | | | |
| % <5μ | 98.5 | 98.2 | 99.2 | 95.5 |
| % <2μ | 78.8 | 81.7 | 93.2 | 58.1 |
| % <1μ | 54.2 | 57.0 | 77.8 | 33.3 |
| % <0.5μ | 29.1 | 30.0 | 49.9 | 17.4 |
| % <0.3μ | 14.6 | 14.7 | 26.4 | 9.1 |

TABLE 3

PRODUCTS: CAPIM 90 and CAPIM DL

| | CAPIM 90 | | CAPIM DL | |
|---|---|---|---|---|
| | 1ST RUN | 2ND RUN | 1ST RUN | 2ND RUN |
| BRIGHTNESS | 91.19 | 90.18 | 92.10 | 91.11 |
| L | — | 96.45 | 96.72 | 96.51 |
| a | — | −0.40 | −0.82 | −0.36 |
| b | — | 3.34 | 3.47 | 2.70 |
| pH | 6.57 | 7.21 | — | 6.43 |
| SOLIDS | 71.0% | | 67.0% | |
| BROOKFIELD | | | | |
| 10 | 170 | 380 | 270 | 200 |
| 20 | 125 | 240 | 175 | 140 |
| 50 | 88 | 142 | 108 | 84 |
| 100 | 92 | 113 | 95 | 84 |
| HERCULES | 17 dyne | 3.8 dyne | 775 rpm | 820 rpm |
| SEDIGRAPH | | | | |
| % <0.5 | 51.2 | 48.3 | 35.9 | 30.4 |
| % <1.0 | 76.0 | 76.5 | 60.4 | 57.0 |
| % <2.0 | 91.1 | 92.7 | 80.7 | 79.2 |

Example 4

High Brightness Kaolin Blends

TABLE 4

COMPARISON OF CAPIM BLENDS AGAINST CAPIM 90 LWC OFFSET

| KAOLIN | OPACITY | BRIGHT-NESS | SHEET GLOSS | PRINT GLOSS | PARKER ROUGHNESS |
|---|---|---|---|---|---|
| Capim DL | 81.1 | 75.3 | 48 | 69 | 0.90 |
| Capim DL | 81.6 | 75.2 | 48 | 71 | 0.85 |

Example 5

Application-Paper Coating

The data presented in Table 5 demonstrates beneficial properties of the high brightness kaolin pigments ("Capim"). removal of calcined clay, property improvement, and can be used with commercial Georgia clay (DB-Kote-2).

TABLE 5

PILOT COATER TRIALS

| PIGMENT BLEND | COAT WEIGHT (g/m) | OPAC-ITY | BRIGHT-NESS | SHEET GLOSS | PRINT GLOSS | MISS-ING DOTS |
|---|---|---|---|---|---|---|
| LWC OFFSET | | | | | | |
| 67.5% DB-Plate 22.5% DB-Kote 2 10% DB-Paque | 8 | 85.8 | 70.7 | 71 | 77 | — |
| 100% Capim | 8 | 86.9 | 72.1 | 70 | 84 | — |
| LWC Roto | | | | | | |
| 71% DB-Plate 24% DB-Kote 2 5% DB-Paque | 8 | 86.3 | 68.3 | 64 | 56 | 37 |
| 100% Capim | 8 | 87.3 | 70.7 | 67 | 56 | 18 |
| 75% Capim 25% DB-Kote 2 | 8 | 85.9 | 69.4 | 67 | 56 | 36 |

The data presented in Table 6 demonstrates the improved coating rheology of the high brightness kaolin clays.

TABLE 6

COATING RHEOLOGY ULWC OFFSET

| PIGMENTS | BROOKFIELD VISCOSITY | | HERCULES VISCOSITY |
|---|---|---|---|
| | 10 RPM | 100 RPM | 4400 RPM |
| 85 US Blend 7 Calcined 4 TiO$_2$ 4 HP-91 | 6280 | 1340 | 8.4 |
| 94 Capim 3 TiO$_2$ 3 HP-91 | 4920 | 1028 | 5.5 |

The data presented in Table 7 demonstrates benefits of using the high brightness kaolins of improvement in print gloss and ink pick strength, partial or complete replacement of premium pigments, calcined clay, TiO$_2$ and plastic pigment (HP-91).

TABLE 7

COATING PROPERTIES ULWC OFFSET

| PIGMENTS | BRIGHTNESS | OPACITY | SHEET GLOSS | PRINT GLOSS | INK PICK |
|---|---|---|---|---|---|
| 85 US Blend 7 Calcined 4 TiO$_2$ 4 HP-91 | 70.4 | 86.0 | 43 | 64 | 2578 |
| 94 Capim 3 TiO$_2$ 3 HP-91 | 70.0 | 85.5 | 45 | 71 | 679 |

The data presented in Table 8 demonstrates the potential to remove titanium dioxide (TiO$_2$) which is a premium pigment (cost approx. 10x cost of high brightness kaolin).

TABLE 8

TiO$_2$ REDUCTION IN LWC OFFSET

| PIGMENT | BRIGHTNESS | OPACITY | SHEET GLOSS | PRINT GLOSS |
|---|---|---|---|---|
| 94 US Blend 6 TiO$_2$ | 73.2 | 89.5 | 55 | 67 |
| 100 Capim | 73.6 | 89.1 | 57 | 70 |

Table 9 demonstrates the better rheology achieved with the high brightness kaolin ("Capim")-containing coating.

TABLE 9

COATING RHEOLOGY - LWC ROTOGRAVURE

| KAOLIN | BROOKFIELD VISCOSITY | | HERCULES VISCOSITY |
|---|---|---|---|
| | 10 RPM | 100 RPM | 4400 RPM |
| 93 US Blend 7 Calcined | 11480 | 2192 | 8.9 |
| 100 Capim | 3760 | 788 | 4.6 |

Table 10 demonstrates the following benefits of using the high brightness kaolin pigments (Capim) in paper coating: removal of calcined clay which is a premium pigment, and property gains.

TABLE 10

COATING PROPERTIES
LWC ROTOGRAVURE - PILOT COATER DATA

| KAOLIN | BRIGHTNESS | OPACITY | PPS BRIGHTNESS | PPS POROSITY | ROTOPRINTABILITY MISSING DOTS |
|---|---|---|---|---|---|
| 95 US Blend 5 Calcined | 68.3 | 85.8 | 1.27 | 5.22 | 34 |
| 100 Capim | 70.7 | 87.3 | 1.23 | 6.20 | 18 |

The following data illustrates the benefits of the high brightness clay in coated freesheet relative to commercial currently No. 1 U.S. coating clays, as well as premium structured clay. Binder systems were as listed in Table 11.

TABLE 11

CAPIM CLAY IN COATED FREESHEET

| BINDER | PARTS BY WEIGHT | | |
|---|---|---|---|
| Starch | 8 | 4 | 0 |
| Latex | 8 | 12 | 16 |

In all binder systems, the coating with high brightness clays (Capim) had lower Brookfield viscosity and more favorable Hercules viscosity. This can result in improved runnability and increased coating solids. The data is presented in the following Tables 12–19. In all of the tables, "Capim" is the high brightness kaolin. "DB-Kote" (Dry Branch Kaolin Company, Macon, Ga.) has 88 brightness; "Hi Brite" has 90 brightness. Relative to the currently No. 1 U. S. clays, the high brightness clay showed:

(1) Equal or higher opacity and sheet gloss.
(2) Higher brightness and print gloss. Higher print gloss with equivalent sheet gloss means a better "snap" or delta gloss for high brightness clay.
(3) More favorable pick strength which means that lower binder can be utilized. Data in the 12/4 binder system shows use of high brightness clay with 2 parts lower latex resulted in more favorable pick strength than the structured clay.

Table 12 demonstrates coating rheology using high brightness clay (Capim) as compared to two high-selling commercial products, at 67% coating solids.

TABLE 12

COATING RHEOLOGY
16 LATEX BINDER

| KAOLIN | BROOKFIELD | | HERCULES VISCOSITY |
|---|---|---|---|
| | 10 RPM | 100 RPM | 4400 RPM |
| Capim | 1400 | 280 | 4.7 dyness |
| DK-Kote 1 | 4600 | 825 | 13.6 |
| Hi Brite No. 1 | 3560 | 620 | 11.8 |

In Table 13, the coat weight is 6 Lbs.

TABLE 13

COATING PROPERTIES
12/4 BINDER

| KAOLIN | OPACITY | BRIGHTNESS | SHEET GLOSS | PRINT GLOSS | PARKER ROUGHNESS | INK PICK |
|---|---|---|---|---|---|---|
| Capim | 88.5 | 83.0 | 66 | 73 | 1.27 | 340 |
| DB-Kote 1 | 88.2 | 81.6 | 64 | 63 | 1.51 | 2280 |
| Hi Brite No. 1 | 88.4 | 82.5 | 65 | 66 | 1.47 | 1770 |

In Table 14, the coating solids are 66%.

TABLE 14

COATING RHEOLOGY
12 LATEX/4 STARCH

| KAOLIN | BROOKFIELD | | HERCULES VISCOSITY |
|---|---|---|---|
| | 10 RPM | 100 RPM | 4400 RPM |
| Capim | 5400 | 1075 | 8.6 |
| DB-Kote 1 | 13440 | 2210 | 14.1 |
| Hi Brite No. 1 | 9240 | 1770 | 11.5 |

In Table 15, the coat weight is 6 Lbs.

TABLE 15

COATING PROPERTIES
12 LATEX/4 STARCH

| KAOLIN | OPACITY | BRIGHTNESS | SHEET GLOSS | PRINT GLOSS | PARKER ROUGHNESS | INK PICK |
|---|---|---|---|---|---|---|
| Capim | 88.5 | 83.0 | 66 | 73 | 1.27 | 340 |
| DB-Kote 1 | 88.2 | 81.6 | 64 | 63 | 1.51 | 2280 |
| Hi Brite No. 1 | 88.4 | 82.5 | 65 | 66 | 1.47 | 1770 |

In Table 16, the coating solids are 66%.

TABLE 16

COATING RHEOLOGY
12 LATEX / 4 STARCH

| KAOLIN | BROOKFIELD | | HERCULES VISCOSITY |
| --- | --- | --- | --- |
| | 10 RPM | 100 RPM | 4400 RPM |
| Capim | 6080 | 1010 | 8.2 dynes |
| Capim (Latex @ 10 parts) | 5920 | 1040 | 8.4 |
| Structured | 6520 | 1070 | 13.8 |

TABLE 17

COATING PROPERTIES
12 LATEX/4 STARCH

| KAOLIN | OPACITY | BRIGHTNESS | SHEET GLOSS | PRINT GLOSS | INK PICK |
| --- | --- | --- | --- | --- | --- |
| Capim | 87.6 | 83.3 | 67 | 80 | 165 |
| Capim (Latex @ 10 parts) | 87.9 | 83.5 | 67 | 80 | 550 |
| Structured | 87.9 | 83.6 | 66 | 82 | 1130 |

In Table 18, the coating solids are 62%.

TABLE 18

COATING RHEOLOGY
8 LATEX / 8 STARCH

| KAOLIN | BROOKFIELD | | HERCULES VISCOSITY |
| --- | --- | --- | --- |
| | 10 RPM | 100 RPM | 4400 RPM |
| Capim | 8000 | 1480 | 7.1 dynes |
| DB-Kote 1 | 11840 | 2445 | 8.2 |
| Hi Brite No. 1 | 9440 | 2025 | 8.8 |

In Table 19, the coat weight is 6 Lbs.

TABLE 19

COATING PROPERTIES
8 LATEX/8 STARCH

| KAOLIN | OPACITY | BRIGHTNESS | SHEET GLOSS | PRINT GLOSS | PARKER ROUGHNESS | INK PICK |
| --- | --- | --- | --- | --- | --- | --- |
| Capim | 85.9 | 82.5 | 66 | 81 | 0.99 | 650 |
| DB-Kote 1 | 85.7 | 80.7 | 68 | 75 | 1.02 | 4140 |
| Hi Brite No. 1 | 85.4 | 81.9 | 69 | 82 | 0.98 | 4830 |

Example 6
Characterization of Paper Filler Blends

TABLE 20

CAPIM CLAY IN ALKALINE PAPERMAKING SYSTEMS

| PIGMENT BLEND | OPACITY | | BRIGHTNESS | | BREAKING LENGTH | |
| --- | --- | --- | --- | --- | --- | --- |
| | 12%[1] | 18% | 12% | 18% | 12% | 18% |
| Precipitated CaCO$_3$[2] | 83.7 | 85.3 | 88.3 | 89.2 | 3.01km | 2.31km |
| 67% PCC/33% DB-Plate 1000 | 81.6 | 84.1 | 86.3 | 87.1 | 3.82 | 2.91 |
| 67% PCC/33% Capim DL | 80.8 | 83.6 | 87.1 | 88.1 | 3.93 | 3.10 |
| 67% PCC/33% Capim 90 | 81.5 | 84.3 | 87.2 | 88.2 | 3.59 | 2.63 |

[1]Percent total filler in sheet
[2]PCC

TABLE 21

CAPIM CLAY AS A
FILLER IN ALKALINE PAPERMAKING SYSTEMS

| FILLER | OPACITY | | BRIGHTNESS | | BREAKING LENGTH | |
| --- | --- | --- | --- | --- | --- | --- |
| | 12%[1] | 18% | 12% | 18% | 12% | 18% |
| Precipitated CaCO$_3$[2] | 85.6 | 87.7 | 89.1 | 90.3 | 3.01km | 2.31km |
| 67% PCC/33% Capim No. 2 | 84.0 | 87.6 | 88.1 | 89.3 | 3.92 | 2.99 |
| 67% PCC/33% DB-Kote 2 | 83.5 | 86.7 | 86.9 | 87.9 | 3.65 | 2.51 |

[1]Percent total filler in sheet
[2]PCC

Throughout this application, various publications are referenced. The disclosures of these publications in their entireties are hereby incorporated by reference into this application in order to more fully describe the state of the art to which this invention pertains.

Although the present process has been described with reference to specific details of certain embodiments thereof, it is not intended that such details should be regarded as limitations upon the scope of the invention except as and to the extent that they are included in the accompanying claims.

What is claimed is:

1. A method of making a high brightness kaolin clay comprising:
    a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the brightness;
    b. fractionating the clay to retain a first fraction that is 90% less than two microns in particle size, separately from a second fraction of the remaining clay, wherein the retained 90% less than two micron fraction comprises the high brightness kaolin clay.

2. The method of claim 1, further comprising, prior to the magnetic separation step, the step of settling out any heavy metal impurities present in the crude.

3. The method of claim 2, wherein the settling step comprises a settling time of 5 minutes per 4 feet of clay.

4. A method of making a high brightness kaolin clay comprising:
   a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the brightness to make a purified feed;
   b. fractionating the clay into a first fraction of 90% less than 2 micron and a second fraction of remaining clay;
   c. blending the purified feed with the second fraction to form a blended clay having a ratio of purified feed to second fraction of from 100:0 to 0:100;
   d. grinding the blended clay to a particle size of from 60 to 90% less than two microns.

5. The method of claim 4, further comprising, prior to the magnetic separation step, the step of settling out any heavy metal impurities present in the crude.

6. A method of making a high brightness kaolin clay comprising:
   a. applying magnetic separation to a blunged, degritted kaolin clay crude having a particle size distribution as follows: 50%–70% less than 2 microns, 20%–35% less than 0.5 microns and 5%–20% less than 0.3 microns, all e.s.d. as determined by Sedigraph for a period of time sufficient to achieve the brightness to make a purified feed;
   b. fractionating the clay into a first fraction of 90% less than 2 microns and a second fraction of remaining clay;
   c. blending the purified feed with the second fraction to form a blended clay having a ratio of purified feed to second fraction of from 100:0 to 0:100;
   d. grinding the blended clay to a particle size of from 60% to 90% less than two microns; and
   e. fractionating the ground clay to recover a fraction of about 90% less than two microns.

7. The method of claim 4, wherein the blended clay is ground to a particle size of from 75 to 80% less than two microns.

8. The method of claim 4, wherein the blended clay is ground with a grinding media comprising glass beads or sand.

9. A method of making a high brightness kaolin clay according to claim 1, wherein said brightness is 87% or greater.

10. A method of making a high brightness kaolin clay according to claim 1, wherein said brightness is 90% or greater.

11. A method of making a high brightness kaolin clay according to claim 2, wherein said brightness is 87% or greater.

12. A method of making a high brightness kaolin clay according to claim 2, wherein said brightness is 90% or greater.

13. The method of claim 1, further comprising the step of further fractionating the second fraction of remaining clay to retain a third fraction that is 60% less than two microns in particle size, and wherein the 60% less than two micron fraction comprises the high brightness kaolin clay.

14. The method of claim 2, further comprising the step of further fractionating the second fraction of remaining clay to retain a third fraction that is 60% less than two microns in particle size, and wherein the 60% less than two micron fraction comprises the high brightness kaolin clay.

15. A method of making a high brightness kaolin clay according to claim 13, wherein said brightness is 87% or greater.

16. A method of making a high brightness kaolin clay according to claim 13, wherein said brightness is 90% or greater.

17. A method of making a high brightness kaolin clay according to claim 4, wherein said brightness is 87% or greater.

18. A method of making a high brightness kaolin clay according to claim 4, wherein said brightness is 90% or greater.

19. A method of making a high brightness kaolin clay according to claim 6, wherein said brightness is 87% or greater.

20. A method of making a high brightness kaolin clay according to claim 6, wherein said brightness is 90% or greater.

21. A method of making a high brightness kaolin clay comprising:
   a. applying magnetic separation to a blunged, degritted kaolin clay crude obtained from an area in the Rio Capim area of Brazil having coordinates south 02°-21", west 47°-52' and having a particle size distribution as follows: 50%–70% less than 2 microns, 20%–35% less than 0.5 microns and 5%–20% less than 0.3 microns, all e.s.d. as determined by Sedigraph for a period of time sufficient to achieve the brightness;
   b. fractionating the clay to retain a first fraction that is 90% less than two microns in particle size, separately from a second fraction of the remaining clay, wherein the retained 90% less than two micron fraction comprises the high brightness kaolin clay.

22. A nondelaminated high brightness kaolin clay having the following characteristics.
   a. particle size of 90% less than two microns (e.s.d. as measured by Sedigraph) and a ratio of: % less than 2.0 microns/% less than 0.5 microns <2.0;
   b. brightness of 87 or greater, and
   c. Brookfield viscosity measured at 20 rpm and 71% solids of greater than 100 cp.

23. The nondelaminated high brightness kaolin clay of claim 22, wherein the brightness is 90 or greater.

24. A nondelaminated high brightness kaolin clay having the following characteristics:
   a particle size of at least 60% less than two microns (e.s.d. as measured by Sedigraph);
   b brightness of 87 or greater; and
   c. Brookfield viscosity measured at 20 rpm and 71% solids of greater than 175 cp.

25. The nondelaminated high brightness kaolin clay of claim 24, wherein the brightness is 90 or greater.

26. A delaminated high brightness kaolin clay having the following characteristics:
   a. particle size of from 60% to 90% less than two microns (e.s.d. as measured by Sedigraph);
   b. brightness of 87% or greater; and
   c. Hercules viscosity of less than 1000 rpm at 18 dynes and 67% solids.

27. The delaminated high brightness kaolin clay of claim 26, wherein the brightness is 90 or greater.

28. A high brightness kaolin clay comprising a blend of the following component clays:
   a. a nondelaminated kaolin clay having the following characteristics:
      i. particle size of 90% less than two microns (e.s.d. as measured by Sedigraph) and a ratio of: % less than 2.0 microns/% less than 0.5 microns ≦2.0;

ii. brightness of 87% or greater; and
iii. Brookfield viscosity measured at 20 rpm and 71% solids of greater than 100 cp; and
b. a delaminated kaolin clay having the following characteristics:
  i. particle size of from 60% to 90% less than two microns (e.s.d. as measured by Sedigraph);
  ii. brightness of 87% or greater; and
  iii. Hercules viscosity of less than 1000 rpm at 18 dynes and 67% solids.

29. The blended clay of claim 28, wherein the component clays are present in a ratio of from 70:30 to 30:70.

30. A high brightness kaolin clay comprising a blend of the following component clays:
a. a nondelaminated kaolin clay having the following characteristics:
  i. particle size of 60% less than two microns (e.s.d. as measured by Sedigraph);
  ii. brightness of 87% or greater; and
  iii. Brookfield viscosity measured at 20 rpm and 71% solids of greater than 175 cp; and
b. a delaminated kaolin clay having the following characteristics:
  i. particle size of from 60% to 90% less than two microns (e.s.d. as measured by Sedigraph);
  ii. brightness of 87% or greater; and
  iii. Hercules viscosity of less than 1000 rpm at 18 dynes and 67% solids.

31. The blended clay of claim 30, wherein the component clays are present in a ratio of from 70:30 to 30:70.

32. A method of making a high brightness kaolin clay comprising blending the following component clays:
a. a nondelaminated kaolin clay having the following characteristics:
  i. particle size of 90% less than two microns (e.s.d. as measured by Sedigraph) and a ratio of: % less than 2.0 microns/% less than 0.5 microns $\leqq 2.0$;
  ii. brightness of 87% or greater; and
  iii. Brookfield viscosity measured at 20 rpm and 71% solids of greater than 100 cp; and
b. a delaminated kaolin clay having the following characteristics:
  i. particle size of from 60% to 90% less than two microns (e.s.d. as measured by Sedigraph);
  ii. brightness of 87% or greater; and
  iii. Hercules viscosity of less than 1000 rpm at 18 dynes and 67% solids.

33. The method of claim 32, wherein the component clays are present in a ratio of from 70:30 to 30.70.

34. A method of making a high brightness kaolin clay comprising blending the following component clays:
a. a nondelaminated kaolin clay having the following characteristics:
  i. particle size of 60% less than two microns (e.s.d. as measured by Sedigraph);
  ii. brightness of 87% or greater; and
  iii. Brookfield viscosity measured at 20 rpm and 71% solids of greater than 175 cp; and
b. a delaminated kaolin clay having the following characteristics:
  i. particle size of from 60% to 90% less than two microns (e.s.d. as measured by Sedigraph);
  ii. brightness of 87% or greater; and
  iii. Hercules viscosity of less than 1000 rpm at 18 dynes and 67% solids.

35. The method of claim 34, wherein the component clays are present in a ratio of from 70:30 to 30:70.

36. A filler system for paper products containing precipitated calcium carbonate, comprising
a. precipitated calcium carbonate; and
b. the high brightness kaolin clay made by the method of claim 11,
wherein precipitated calcium carbonate is present at $\geqq 28\%$ by weight in the paper and the kaolin clay is present at a level of at least 50% of the precipitated calcium carbonate.

37. A filler system for paper products containing precipitated calcium carbonate, comprising
a. precipitated calcium carbonate; and
b. the high brightness kaolin clay made by the method of claim 15,
wherein precipitated calcium carbonate is present at $\geqq 8\%$ by weight in the paper and the kaolin clay is present at a level of at least 50% of the precipitated calcium carbonate.

38. A filler system for paper products containing precipitated calcium carbonate, comprising
a. precipitated calcium carbonate; and
b. the high brightness kaolin clay made by the method of claim 17,
wherein precipitated calcium carbonate is present at $\geqq 8\%$ by weight in the paper and the kaolin clay is present at a level of at least 50% of the precipitated calcium carbonate.

39. A filler system for paper products containing precipitated calcium carbonate, comprising
a. precipitated calcium carbonate; and
b. the high brightness kaolin clay made by the method of claim 19,
wherein precipitated calcium carbonate is present at $\geqq 8\%$ by weight in the paper and the kaolin clay is present at a level of at least 50% of the precipitated calcium carbonate.

40. A method of producing a precipitated calcium carbonate-containing paper product in which precipitated calcium carbonate is added at $\geqq 28\%$ of the weight of the paper and kaolin is added at a level of at least 50% of precipitated calcium carbonate level, comprising adding as filler a blend of
a. precipitated calcium carbonate; and
b. the high brightness kaolin clay made by the method of claim 11.

41. A method of producing a precipitated calcium carbonate-containing paper product in which precipitated calcium carbonate is added at $\geqq 8\%$ of the weight of the paper and kaolin is added at a level of at least 50% of precipitated calcium carbonate level, comprising adding as filler a blend of
a. precipitated calcium carbonate; and
b. the high brightness kaolin clay made by the method of claim 15.

42. A method of producing a precipitated calcium carbonate-containing paper product in which precipitated calcium carbonate is added at $\geqq 8\%$ of the weight of the paper and kaolin is added at a level of at least 50% of precipitated calcium carbonate level, comprising adding as filler a blend of
a. precipitated calcium carbonate; and
b. the high brightness kaolin clay made by the method of claim 17.

43. A method of producing a precipitated calcium carbonate-containing paper product in which precipitated calcium carbonate is added at $\geqq 8\%$ of the weight of the paper and kaolin is added at a level of at least 50% of precipitated calcium carbonate level, comprising adding as filler a blend of a. precipitated calcium carbonate; and b. the high brightness kaolin clay made by the method of claim 19.

44. The method of claim 4, wherein the blended clay is ground to a particle size of 80% less than two microns.

45. The method of claim 2, where in said high brightness kaolin clay has a Brookfield viscosity measured at 20 rpm and 71% solids of greater than 100 cp.

46. The method of claim 3, where in said high brightness kaolin clay has a Brookfield viscosity measured at 20 rpm and 71% solids of greater than 175 cp.

47. The method of claim 4, where in said high brightness kaolin clay has a Hercules viscosity of less than 1000 rpm at 18 dynes and 67% solids.

48. The method of claim 6, where in said high brightness kaolin clay has a Hercules viscosity of less than 1000 rpm at 18 dynes and 67% solids.

49. The method of claim 6, further comprising, prior to the magnetic separation step, the step of settling out any heavy metal impurities present in the crude.

50. The method of claim 49, wherein the settling step comprises a settling time of 5 minutes per 4 feet of clay.

51. The method of claim 6, wherein the blended clay is ground to a particle size of from 75% to 80% less than two microns.

52. The method of claim 6, wherein the blended clay is ground with a grinding media comprising glass beads or sand.

53. The method of claim 6, wherein said kaolin clay crude is obtained from an area in the Rio Capim area of Brazil having coordinates south 02°–21', west 47°–52'.

* * * * *